(12) United States Patent
Desurmont et al.

(10) Patent No.: US 6,730,744 B1
(45) Date of Patent: May 4, 2004

(54) METHOD FOR COPOLYMERIZATION AND RESULTING COPOLYMERS

(75) Inventors: Guillaume Desurmont, Kyoto (JP); Hajime Yasuda, Higashihiroshima (JP); Jean Malinge, Loubieng (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 09/937,090

(22) PCT Filed: Mar. 14, 2000

(86) PCT No.: PCT/FR00/00614

§ 371 (c)(1), (2), (4) Date: Jul. 15, 2002

(87) PCT Pub. No.: WO00/56778

PCT Pub. Date: Sep. 28, 2000

(30) Foreign Application Priority Data

Mar. 24, 1999 (FR) ............................................. 99 03669

(51) Int. Cl.[7] ...................... C08F 297/08; C08F 210/16; C08F 110/06; C08L 23/12
(52) U.S. Cl. ........................ 525/245; 525/268; 525/269; 525/323; 525/333.7; 526/159
(58) Field of Search ................................ 525/245, 268, 525/269, 323, 333.7; 526/159

(56) References Cited

U.S. PATENT DOCUMENTS

| 4,454,306 A | 6/1984 | Fujii et al. |
|---|---|---|
| 4,576,994 A | 3/1986 | Dorrer et al. |
| 5,066,739 A | 11/1991 | Pettijohn et al. |
| 5,218,064 A | 6/1993 | Yasuda et al. |
| 5,391,629 A | * 2/1995 | Turner et al. ............... 525/268 |
| 5,698,634 A | * 12/1997 | Yasuda et al. ............. 526/170 |
| 5,700,896 A | 12/1997 | Dolle et al. |

FOREIGN PATENT DOCUMENTS

| EP | 0462588 | 12/1991 |
|---|---|---|
| EP | 0942020 | 9/1999 |
| WO | WO 9911684 | 3/1999 |

OTHER PUBLICATIONS

Yasuda et al., "Polymerization of Olefins by Rare Earth Metal Complex with Bulky Substituents," *Tetrahedron, NL., Elsevier Science Publishers*, Amsterdam, vol. 51, No. 15, pp. 4563–4570 XP004105021, 1995.

* cited by examiner

*Primary Examiner*—Samuel A. Acquah
*Assistant Examiner*—Olga Asinovsky
(74) *Attorney, Agent, or Firm*—Millen White Zelano & Branigan

(57) ABSTRACT

The invention concerns a method for preparing block copolymers comprising steps which consist in: polymerising a first monomer using an organolanthanide catalyst wherein said catalyst in the form of a hydride complex of a trivalent metal from the group of rare earths; then in polymerising at least a second monomer. The invention also concerns block copolymers whereof the blocks are polyolefins.

21 Claims, No Drawings

METHOD FOR COPOLYMERIZATION AND RESULTING COPOLYMERS

This application claims priority to PCT/FR00/00614 filed Mar. 14, 2000, which claims priority to French Patent Application No. 9903669 filed Mar. 24, 1999.

The present invention relates to a novel method of preparing block copolymers, and to certain of these block copolymers.

Block copolymers are widely known. However, it is also known that it is difficult to prepare block copolymers one of whose blocks is a polyolefin (PO), especially if the desire is that the alpha-olefin should be inserted in a regular manner in order to give a stereoregular and/or regioregular copolymer. It is also known that it is (virtually) impossible to prepare block copolymers whose two blocks are polyolefins, whether crystalline or amorphous.

Yamahiro et al., Macromol. Chem. Phys. 200, 134–141 (1999), describes a process of stopped-flow polymerization for obtaining "true" PP/EP block copolymers. However, the copolymers produced are limited in terms of molecular mass, since they have a molecular weight Mn of less than or equal to 16 000 and a polydispersity index of between 3.0 and 3.3. Other molecular mass characteristics are excluded by this type of technique: in particular, higher molecular masses cannot be attained, since they are a function of the polymerization time, which can only be short (of the order of from 0.1 to 0.2 s) and in any case less than the growth time of a chain; in particular, also, lower polydispersity indexes cannot be attained, since stopped-flow polymerization is not a true polymerization with living species, but comprises a large number of transfer reactions.

Therefore, there is to date no true PP/EP copolymer, with a PP block and an EP block linked together, which has a sufficient molecular mass. This PP/EP copolymer is a crystalline PO/amorphous PO copolymer, which would find advantageous application in PP/EP polymer blends. In these blends, the crystalline PP forms the continuous phase, which is modified by the addition of EP copolymer (more specifically EPR, which is elastomeric) which forms a nodular disperse phase. A true copolymer added to this blend would play a part similar to that played by an emulsifier in emulsions, improving the compatibility of the phases, and ultimately would enhance the impact/rigidity trade-off.

This same problem of difficulty in preparing "true" block copolymers occurs with copolymers one of whose blocks is a block of a polar monomer, such as MMA.

The patent application EP-A-0634429 in the name of Mitsui describes the preparation of block copolymers, one block being a polyolefin and one block being derived from a vinyl, vinylidene or lactone monomer. The catalyst used is an alkyl complex of a metal from the rare earth group, with bridged cyclopentadiene rings (bridged by a dimethylsilylene group). This document describes in particular the catalyst $Me_2Si(2-Me_3Si,4-tBuCp)_2YCH(SiMe_3)_2$, with— optionally—a THF-type donor complexed to the metal. The copolymers obtained, however, are not satisfactory, since the polyolefin fraction represents too low a fraction of the final copolymer. Moreover, if the polydispersity values appear to be acceptable, it is only because these values are derived from the PMMA fraction, representing the quasitotality of the copolymer. Moreover, the catalysts do not in fact provide true copolymers. In effect, extensive transfer reactions (that is, the reactions which put an end to the living nature of the polymerization) lead to the formation not of true copolymers but of a mixture of homopolymers and copolymers. Moreover, the reaction times are fairly long.

The article by Yasuda et al., Tetrahedron, Vol. 51, No. 15, pp. 4563–4570, 1995, describes hydride derivatives of lanthanides in the form of a complex with bridged cyclopentadiene rings (bridged by a dimethylsilylene group), these cyclopentadiene rings carrying substituents which have a significant steric bulk ("bulky substituent"). This document describes in particular the hydride catalyst $Me_2Si(2-Me_3Si, 4-Me_2tBuSiCp)_3YH$ (represented in its dimer form). These compounds are obtained in situ by hydrogenolysis of the starting alkyl derivative, and are then used for the polymerization of alpha-olefins. Although such compounds are described as having an alpha-olefin polymerization activity greater than that of the alkyl derivatives from which they are derived, the polymerization times are still very long, of the order of half a day or a day.

These hydride catalysts also have the classic disadvantage of hydrides, namely that hydride derivatives are known to be unstable and to break down rapidly at high temperature.

The search is therefore on for an effective method of preparing block copolymers: particularly, on the one hand, copolymers one of whose blocks includes a polar fraction, and, on the other hand, copolymers whose two blocks are polyolefins.

The invention accordingly provides a method of preparing block copolymers, comprising the steps of polymerizing a first monomer using an organolanthanide catalyst in which said catalyst is in the form of a hydride complex of a trivalent metal from the rare earth group, then polymerizing at least one second monomer.

In one embodiment, the hydride complex of a trivalent metal from the rare earth group has the formula I:

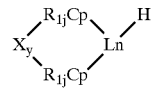

which:

Cp is a cyclopentadienyl radical;

$R_1$, identical or different at each occurrence, is a substituent of the cyclopentadienyl group and is an alkyl radical or a silicon-containing hydrocarbon radical, containing from 1 to 20 carbon atoms, and with the Cp ring to which it is linked optionally forming an indenyl or fluorenyl ring system, it being possible optionally for each $R_1$ to be substituted;

j, identical or different at each occurrence, is an integer from 1 to 5 inclusive;

X is a divalent alkylene radical or a divalent, silicon-containing hydrocarbon radical, containing from 1 to 20 carbon atoms, optionally containing other heteroatoms such as oxygen;

y is 1 or 2;

Ln is a trivalent metal from the rare earth group, selected from Y, Sc, La, Ce, Pr, Nd, Pm, Sm, Eu, Gd, Tb, Dy, Ho, Er, Tm, Yb and Lu.

In one embodiment, in the formula I, X is $Si(R)_2$ in which R is an alkyl radical having from 1 to 4 carbon atoms.

In one embodiment, in the formula I, $R_1$ is an alkyl radical or a silicon-containing hydrocarbon radical, containing from 1 to 6 carbon atoms, which is unsubstituted, and j is 1, 2 or 3.

In one embodiment, in the formula I, $R_{1j}Cp$ is the group $2-Me_3Si, 4-Me_2tBuSiCp$ or the group $2-Me_3Si, 4-tBuCp$.

In one embodiment, in the formula I, Ln is Y or Sm.

In one embodiment, the catalyst is Me$_2$Si(2-Me$_3$Si, 4-Me$_2$tBuSiCp)$_2$YH or Me$_2$Si(2-Me$_3$Si, 4-tBuCp)$_2$SmH.

In one embodiment, the catalyst is racemic.

In one embodiment, the catalyst is generated in situ in the presence of at least one portion of the first monomer.

In one embodiment, the blocks are homopolymers or random copolymers.

In one embodiment, the block copolymer comprises a block of the first monomer which is an alpha-olefin and a block of the second monomer which is a vinyl, vinylidene or lactone compound.

In this embodiment, the vinyl or vinylidene compound is represented by the formula $$H_2C=CR'Z$$

in which R' is hydrogen or an alkyl radical having from 1 to 12 carbon atoms and Z is an electron-withdrawing radical.

In this embodiment, the vinyl or vinylidene compound is an ester of an unsaturated carboxylic acid.

In this embodiment, the polyolefin is crystalline.

In one embodiment, the second monomer is polar.

In one embodiment, the method is for preparing a PO/PMMA or PO/PL copolymer.

In this embodiment, the PO block is an iPO block.

In one embodiment, the block copolymer comprises a block of the first monomer which is a first alpha-olefin and a block of the second monomer which is a second alpha-olefin.

In a variant of this embodiment, the first polyolefin is crystalline and the second polyolefin is crystalline.

In this variant, the copolymer is a PP/PE copolymer.

In another variant of this embodiment, the first polyolefin is crystalline and the second polyolefin is amorphous.

In this variant, the copolymer is a PP/EP copolymer.

In one embodiment, the PP block is an iPP block.

The invention also provides a copolymer comprising a first block of a crystalline polyolefin and a second block of an amorphous polyolefin, with the exception of a PP/EP copolymer having a molecular mass Mn of less than or equal to 16 000 and a polydispersity index of between 3 and 3.3.

In one embodiment, the copolymer is a PP/EP copolymer, particularly one in which the PP block is an iPP block.

The invention also provides a copolymer comprising a first block of a crystalline polyolefin and a second block of a crystalline polyolefin.

The invention also provides a copolymer comprising a first block of an amorphous polyolefin and a second block of an amorphous polyolefin.

In one embodiment, the blocks are homopolymers or random copolymers.

The invention is now described in greater detail in the following description.

Catalyst.

The catalyst is an organolanthanide in the form of a hydride complex of a trivalent metal from the rare earth group (bridged); advantageously it has the formula I:

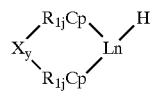

in which:
 Cp is a cyclopentadienyl radical, substituted preferably in positions 2 and 4;

R$_1$, identical or different at each occurrence, is a substituent of the cyclopentadienyl group and is an alkyl radical or a silicon-containing hydrocarbon radical, containing from 1 to 20 carbon atoms, in particular from 1 to 6 carbon atoms, optionally forming an indenyl or fluorenyl ring system with the Cp ring to which is linked, it being possible optionally for each R$_1$ to be substituted, for example, by up to 3 halogens;

j, identical or different at each occurrence, is an integer from 1 to 5 inclusive, in particular j is 1, 2 or 3;

in particular R$_{1j}$Cp is the group 2-Me$_3$Si, 4-Me$_2$tBuSiCp, or the group 2-Me$_3$Si, 4-tBuCp;

X is a divalent alkylene radical or a divalent, silicon-containing hydrocarbon radical, containing from 1 to 20 carbon atoms, optionally containing other heteroatoms such as oxygen, in particular of formula Si(R)$_2$ where R is an alkyl radical having 1 to 4 carbon atoms, in particular SiMe$_2$;

y is 1 or 2, preferably 1;

Ln is a trivalent metal from the rare earth group, selected from Y, Sc, La, Ce, Pr, Nd, Pm, Sm, Eu, Gd, Tb, Dy, Ho, Er, Tm, Yb and Lu, in particular Y and Sm.

Examples of catalysts are Me$_2$Si(2-Me$_3$Si, 4-Me$_2$tBuSiCp)$_2$YH and Me$_2$Si(2-Me$_3$Si, 4-tBuCp)$_2$SmH.

The catalyst may in fact have ligands which are similar to those found for the catalysts known as "group IV" or metallocene or Kaminsky catalysts. A restricted geometry may also be envisaged, and also ligands other than those described above in relation with the formula I.

In one variant, the catalyst is in a racemic form. This form makes it possible to obtain isotactic polymers.

The catalysts of the invention in hydride form are prepared, for example, by hydrogenation from the alkyl precursor, for example by application of molecular hydrogen. The alkyl precursors are described, for example, in the document EP-A-0634429 in the name of Mitsui. This operation may be performed by dissolving the alkyl starting product in a solvent (aliphatic or aromatic hydrocarbon) or suspending it in a nonsolvating hydrocarbon (aliphatic or aromatic hydrocarbon), followed by contact with molecular hydrogen.

Polymerization Method

The polymerization is very effective in particular with the catalyst formed in situ in the presence of the monomer. The proof of this efficacy is the exothermicity of the reaction mixture when the hydrogen is introduced, thereby demonstrating that the polymerization reaction is initiated immediately. Accordingly, each alkyl precursor leads to a potentially polymerizing hydride species, which leads effectively to a polymerization. In the case of the preparation of copolymers, this formation in situ in the presence of the monomer is not necessary; it is, however, preferred.

The method may be implemented with or without solvent. In the case without solvent, it is the liquid monomer itself which plays this part. In the case with solvent, the monomer (in solution or in suspension) may be in gaseous, liquid or solid form.

The polymerization medium may therefore be a solvent, mass or gaseous medium.

The solvent, when used, may be an aliphatic or aromatic hydrocarbon, such as toluene.

The reaction temperature is generally between −78° C. and 150° C., preferably from 0 to 100° C.

The reaction pressure is generally between standard pressure and 200 bar, preferably between 1 and 20 bar.

The reaction time is generally between a few seconds and a few hours.

The monomer (or monomer mixture) may be added in one go or gradually, in a controlled way.

The above conditions apply to the polymerization steps in the case both of homopolymers and copolymers, and even of terpolymers (or more if necessary).

In the case where copolymers are prepared, the second monomer is added, for example, directly to the reaction mixture from the first step. If a solvent has been used during this step, it may either be retained or removed by customary techniques, taking care not to degrade the living species carrying the polyolefinic chain from the first step, and optionally replaced by another solvent.

The present polymerization method is efficient in that:

it makes it possible to generate poly-alpha-olefins of controlled mass, by limiting the transfer reactions the poly-alpha-olefin species is living and in a second step is able to polymerize another monomer (olefinic, vinylic, etc.), in order to lead to the corresponding block copolymer.

The reaction scheme is as follows (where M—H signifies the organolanthanide catalyst in hydride form).

Reaction 1 (generation of a (living) polyolefin)

There is therefore maximum avoidance of the transfer reaction which produces the following final polymer species:

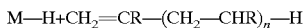

Reaction 2 (addition to the living, growing polyolefin of the second monomer, to give the block copolymer, with limitation of the transfer reaction)

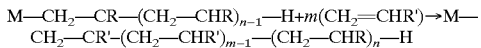

Advantageously, the temperature of the reaction mixture will be controlled. In order to do this, it will be possible to supply the reactor continuously with the monomer; this will make it possible in particular to limit the initial exothermicity.

In the case where it is desired to obtain copolymers, the first step will be implemented under conditions similar to those for the homopolymers, and then the second monomer will be added to the reaction mixture still containing a living species.

The (co)polymers thus obtained are separated by conventional techniques.

Polymers Prepared in the Invention.

The polymers prepared as claimed in the invention may be homopolymers or random copolymers (the two or more monomers being present simultaneously in the reaction mixture) or may be blocked copolymers, or even terpolymers or more if necessary.

The homopolymer, or one copolymer block, may be isotactic, particularly when the catalyst is in a racemic form (and when the monomer is prochiral).

Examples of homopolymers are poly-alpha-olefins, the olefin containing for example from 3 to 20 carbon atoms. Examples of olefins are propylene, 1-butene, 1-hexene, 1-heptene, 1-octene, 1-decene, etc.

Examples of random copolymers are the copolymers of the above olefins, or copolymers based on ethylene.

Examples of block copolymers are copolymers containing a block of the first monomer, which is an alpha-olefin, and a block of the second monomer, which is a vinyl, vinylidene or lactone compound.

Examples of vinyl or vinylidene compounds are represented by the formula $H_2C=CR'Z$, in which R' is hydrogen or an alkyl radical having from 1 to 12 carbon atoms and Z is an electron-withdrawing radical.

Examples of such groups are the esters of an unsaturated carboxylic acid, especially (meth)acrylic acid. Mention may be made of methyl acrylate, ethyl acrylate, propyl acrylate, n-butyl acrylate, phenyl acrylate, methyl methacrylate, ethyl methacrylate, propyl methacrylate, n-butyl methacrylate and phenyl methacrylate.

Examples of lactones include the cyclic esters possessing from 3 to 10 carbon atoms, and are preferably propyllactone, valerolactone and caprolactone.

The polyolefin (PO) block may be crystalline, whereas the block of the second monomer may be polar.

Specific examples of such copolymers are the copolymer PO/PMMA, especially iPO/PMMA, and PO/PL (polylactone) copolymer, especially iPO/PL.

Examples of block copolymers are copolymers containing a block of the first monomer, which is a first alpha-olefin, and a block of the second monomer, which is a second alpha-olefin.

Such examples of copolymers include in particular those in which the first polyolefin is crystalline and the second polyolefin is crystalline, especially a PP/PE copolymer.

Such examples of copolymers include in particular those in which the first polyolefin is crystalline and the second polyolefin is amorphous, especially a PP/EP copolymer.

The above PP block is, for example, an iPP block.

The invention also provides copolymers which are "true" block copolymers, in contradistinction to the copolymers of the prior art, which provides copolymers which are mixtures.

The molecular weight of the homopolymers or copolymers may vary within a wide range, between 500 and $10^8$, preferably between 5 000 and $10^6$. The ratio, in one copolymer, between the monomers A and B may also vary within a very wide range, from 99/1 to 1/99.

The invention therefore also provides copolymers as described above.

In particular, the invention provides block copolymers of the PP/EP (crystalline PO/amorphous PO) type, with the exception of those described in the publication Yamahiro et al., Macromol. Chem. Phys. 200, 134–141 (1999), namely in particular those whose molecular weight Mn is less than or equal to 16 000 and whose polydispersity index is between 3.0 and 3.3. The invention therefore provides in particular block copolymers of the PP/EP type with a molecular weight greater than 16 000, in particular greater than 20 000, especially greater than 50 000, and copolymers of the PP/EP type whose polydispersity index is less than 3, in particular less than 2.5, especially less than 2.

The examples which follow illustrate the invention without limiting it.

Preparation of Complex 1: Me2Si(2-Me3Si, 4-tBu C5H2) 2Sm(THF)2

A solution of Me2Si(2-Me3Si, 4-tBu C5H3)2 (3.01 g, 6.77 mmol) in 60 ml of THF is admixed with 8.2 ml of a 1.66M solution of nBuLi in hexane, i.e., 13.5 mmol, at 0° C. Following reaction of the mixture at ambient temperature for 6 h with stirring, 20 ml of a 0.68M solution of tBuOK in THF, 13.6 mmol, are added. The mixture is refluxed for 12 h and the solution is evaporated to dryness. The product is washed with twice 30 ml of hexane, leading to the potassium disalt of Me2Si(2-Me3Si,4-tBu C5H3)2 in the form of white powder (yield=70%). A suspension of 5.64 g (10.8 mmol) of the potassium disalt of Me2Si(2-Me3Si, 4-tBu C5H3)2 in 80 ml of THF and 10 mmol of SmI2 in 80 ml of THF are added at the same time to 40 ml of THF at −80° C. The reaction mixture is then refluxed for 12 h and the solution is subsequently evaporated to dryness. 50 ml of toluene are added to the residue and the solid obtained is separated by centrifuging. Following removal of the solvent under vacuum, the residue is extracted with twice 15 ml of THF. Recrystallization from a THF/hexane mixture leads to 1 in the form of a violet solid (yield=35%).

Preparation of Complex B: $Me_2Si(2-Me_3Si, 4-Me_2, tBuSiC_5H_2)_2YCH(SiMe_3)_2$ A solution of Me2Si(2-Me3Si, 4-Me2, tBuSi C5H2) 2YCl2Li(THF)2 (2 g, 2.3 mmol) in 60 ml of toluene is admixed with 4.5 ml of a 0.79M solution of (Me3Si)2CHLi in Et2O, i.e., 3.5 mmol, at 0° C. The mixture is stirred from 0° C. to ambient temperature for 13 hours, after which the solvent is evaporated under vacuum. 80 ml of hexane are added to the residue and the suspension is stirred for 24 hours. The insoluble solid is recovered by centrifuging and is recrystallized from hexane to give B—yield=36%.

Preparation of Complex C: Me2Si(2-Me3Si, 4-tBuSi C5H2)2SmCH(SiMe3)2

A solution of Me2Si(2-Me3Si, 4-tBu C5H2)2SmCl2Li (THF)2 (2.3 mmol) in 60 ml of toluene is admixed with 4.5 ml of a 0.79M solution of (Me3Si)2CHLi in Et2O, i.e., 3.5 mmol, at 0° C. The mixture is stirred from 0° C. to ambient temperature for 13 hours, after which the solvent is evaporated under vacuum. 80 ml of hexane are added to the residue and the suspension is stirred for 24 hours. The insoluble solid is recovered by centrifuging and is recrystallized from hexane to give C—yield=28%.

EXAMPLE 1

20 ml of distilled toluene are introduced, using a syringe, into a Schlenk tube (dried at 100° C. for 2 h beforehand), connected to an argon line and equipped with a septum for introducing the reactants and with a magnetic stirrer. The toluene is degassed and then saturated with argon. Catalyst 1 (7.4 mg–0.01 mmol) is introduced and stirring is maintained until it has completely dissolved. Then 2 ml of 1-pentene are introduced through the septum using a syringe. Polymerization is continued for 12 hours at ambient temperature with stirring. To neutralize the catalyst at the end of the reaction, 10 ml of methanol are injected. The precipitated polymer is then isolated by centrifuging, washed with twice 10 ml of methanol and dried under vacuum for 3 hours. The catalytic activity is 161 g of polymer/mol of catalyst/h. The polymer possesses the following characteristics: Mn=10 600. The chain incorporation of the monomer is isotactic (mm>95%).

EXAMPLE 2

The procedure of example 1 is repeated except that the 1-pentene is replaced by 2 ml of 1-hexene. The catalytic activity is 138 g of polymer/mol of catalyst/h, and the polymer possesses the following characteristics: Mn=24 600. The chain incorporation of the monomer is isotactic (mm>95%).

EXAMPLE 3

20 ml of distilled toluene are introduced, using a syringe, into a Schlenk tube (dried at 100° C. for 2 h beforehand), connected to an argon line and equipped with a septum for introducing the reactants and with a magnetic stirrer. The toluene is degassed and then saturated with argon. Catalyst B (8 mg–0.01 mmol) is introduced and stirring is maintained until it has completely dissolved. Then 2 ml of 1-pentene are introduced through the septum using a syringe. Polymerization is continued for 12 hours at ambient temperature with stirring. To neutralize the catalyst at the end of the reaction, 10 ml of methanol are injected. There is no precipitation of polymer. Following evaporation of the solvent, traces of unisolatable, low-mass oligomers are collected. The catalytic activity is very low and is estimated to be less than 10 g of polymer/mol of catalyst/h.

EXAMPLE 4

20 ml of distilled toluene are introduced, using a syringe, into a Schlenk tube (dried at 100° C. for 2 h beforehand), connected to an argon line and equipped with a septum for introducing the reactants and with a magnetic stirrer. The toluene is degassed and then saturated with argon. Precursor B (4 mg) is introduced and the solution is stirred at ambient temperature until its dissolution is complete. The catalytic solution is degassed three times, then a pressure of 1 bar of hydrogen is introduced. Hydrogenation is carried out at ambient temperature for 30 minutes. The solution turns from colorless to a vivid yellow. The hydrogen is subsequently driven off by a stream of argon (5 min). The reaction mixture is cooled to 0° C. Then 2 g of 1-pentene are introduced through the septum using a syringe. Polymerization is continued at 0° C. for 18 hours. To neutralize the catalyst at the end of the reaction, 10 ml of methanol are injected. The precipitated polymer is then isolated by centrifuging, washed with 10 ml of methanol and dried under vacuum for 3 hours. 1.54 g of polymer are collected, corresponding to a conversion of 77% and an activity of 21 g of polymer/g of catalyst/h, said polymer possessing the following characteristics: Mn=28 600. The chain incorporation of the monomer is isotactic (mm>95%).

EXAMPLE 5

The procedure of example 4 is repeated, replacing the 1-pentene by 2 g of 1-hexene. The polymerization is continued at 0° C. for 12 hours. 1.88 g of polymer are collected, corresponding to a conversion of 94% and an activity of 39.2 g of polymer/mol of catalyst/h, said polymer possessing the following characteristics: Mn=53 000. The chain incorporation of the monomer is isotactic (mm>95%).

EXAMPLE 6

The procedure of example 5 is repeated, conducting the polymerization at 20° C. rather than at 0° C. 1.98 g of polymer are collected, corresponding to a conversion of 99% and an activity of 41 g of polymer/mol of catalyst/h, said polymer possessing the following characteristics: Mn=12 900. The chain incorporation of the monomer is isotactic (mm>95%).

EXAMPLE 7

20 ml of distilled toluene are introduced, using a syringe, into a Schlenk tube (dried at 100° C. for 2 h beforehand), connected to an argon line and equipped with a septum for introducing the reactants and with a magnetic stirrer. The toluene is degassed and then saturated with argon. Precursor B (40 mg) is introduced and the solution is stirred at ambient temperature until its dissolution is complete. The catalytic solution is degassed three times, then a pressure of 1 bar of hydrogen is introduced. Hydrogenation is carried out at ambient temperature for 30 minutes. The solution turns from colorless to a vivid yellow. The hydrogen is subsequently driven off by a stream of argon (5 min) Then 2 ml of 1-pentene are introduced through the septum using a syringe. Polymerization is continued at 20° C. for 2 hours. Thereafter, 2 ml of methyl methacrylate are introduced with the septum. The solution changes in appearance to become opaque. The copolymerization is then continued for 2 hours. To neutralize the catalyst at the end of the reaction, 10 ml of methanol are injected. The precipitated polymer is then isolated by centrifuging and dried under vacuum for 3 hours. The polymer at this point has a sticky white appearance (presence of polyolefin characterized by a bimodal GPC possessing two maximum peaks of mass approximately 3 000 and 60 000). The mixture of polymers is subsequently washed with twice 10 ml of hexane (with stirring in hexane for 2 hours), which then allows the olefinic homopolymer to be removed with 10 ml of methanol. 0.21 g of polymer is collected, corresponding to an activity of 5.2 g of polymer/g of catalyst, said polymer possessing the following characteristics: proportion of 1-pentene=20% by weight, proportion of MMA=80% by weight, Mn=45 400. The poly(1-pentene) block is isotactic (mm>95%).

EXAMPLE 8

The procedure of example 7 is repeated, replacing precursor B by 40 mg of precursor C, and replacing the 1-pentene by 2 ml of 1-hexene and the MMA by 2 ml of caprolactone. The polymer possesses the following characteristics: proportion of 1-hexene=12% by weight, proportion of caprolactone=88% by weight, Mn=32 000. The poly(1-hexene) block is isotactic (mm>95%).

EXAMPLE 9

Precursor B (100 mg) is introduced into a Schlenk tube (dried at 100° C. for 2 h beforehand) connected to an argon line and equipped with a septum for introducing the reactants and with a magnetic stirrer. 3 ml of 1-hexene are introduced through the septum using a syringe, and the mixture is degassed three times and held under vacuum. A pressure of 1 bar of hydrogen is then introduced. The polymerization starts immediately, characterized by an exotherm. The reaction mixture becomes highly viscous and the reaction is continued at 20° C. for 3 minutes. Thereafter, 2 ml of caprolactone are introduced via the septum. The polymerization is then continued for 1 hour. To neutralize the catalyst at the end of the reaction, 10 ml of methanol are injected. The precipitated polymer is then isolated by centrifuging, washed with methanol and dried under vacuum for 3 hours. The polymer is in the form of a dry, nontacky powder. 0.45 g of polymer is collected, corresponding to an activity of 4.5 g of polymer/g of catalyst, said polymer possessing the following characteristics: proportion of 1-hexene=4.5% by weight, proportion of caprolactone =95.5% by weight, Mn=23 100. The poly (1-hexene) block is isotactic (mm>95%).

EXAMPLE 10

The procedure of example 9 is repeated, replacing the 1-hexene by 3 ml of 1-pentene and the caprolactone by 3 ml of MMA. 0.56 g of polymer is recovered, corresponding to an activity of 5.6 g of polymer/g of catalyst, said polymer possessing the following characteristics: proportion of 1-pentene=13.5% by weight, proportion of caprolactone= 86.5% by weight, Mn=54 700. The poly(1-pentene) block is isotactic (mm>95%).

EXAMPLE 11

The procedure of example 9 is repeated, replacing catalyst B by 100 mg of catalyst C. 0.52 g of polymer is collected, corresponding to an activity of 5.2 g of polymer/g of catalyst, said polymer possessing the following characteristics: proportion of 1-hexene=50% by weight, proportion of caprolactone=50% by weight, Mn=6 800. The poly(1-hexene) block is isotactic (mm>95%).

EXAMPLE 12

The procedure of example 9 is repeated, replacing catalyst B by 100 mg of catalyst C and the caprolactone by 2 ml of MMA, 0.25 g of polymer is collected, corresponding to an activity of 2.5 g of polymer/g of catalyst, said polymer possessing the following characteristics: proportion of 1-hexene=52% by weight, proportion of MMA=48% by weight, Mn=12 000. The poly(1-hexene) block is isotactic (mm>95%).

EXAMPLE 13

The procedure of example 10 is repeated, replacing catalyst B by 100 mg of catalyst C. 0.41 g of polymer is collected, corresponding to an activity of 4.1 g of polymer/g of catalyst, said polymer possessing the following characteristics: proportion of 1-pentene =91% by weight, proportion of MMA=9% by weight, Mn=6 200. The poly(1-pentene) block is isotactic (mm>95%).

The invention is not limited to the embodiments described, but is capable of numerous variations which are readily accessible to the skilled worker.

What is claimed is:

1. A method of preparing block copolymers, comprising the steps of polymerizing a first monomer consisting of an alpha-olefin containing from 3 to 20 carbon atoms into a first, isotactic block, using a catalyst, then polymerizing at least one second monomer, said catalyst being in the form of a hydride complex of a trivalent metal from the rare earth group, having the formula I:

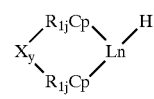

in which:
Cp is a cyclopentadienyl radical;
$R_1$, identical or different at each occurrence, is a substituent of the cyclopentadienyl group and is an alkyl radical or a silicon-containing hydrocarbon radical, unsubstituted and containing from 1 to 6 carbon atoms;
j, identical or different at each occurrence, is 1, 2 or 3;
X is a divalent alkylene radical containing from 1 to 20 carbon atoms or $Si(R)_2$ in which
R is an alkyl radical having from 1 to 4 carbon atoms;
y is 1 or 2;
Ln is Y or Sm.

2. The method as claimed in claim 1, wherein, in the formula I, at least one $R_{1j}Cp$ is the group 2-$Me_3Si$, 4$Me_2tBuSiCp$ or the group 2-$Me_3Si$,4-$tBuCp$.

3. The method as claimed in claim 1, wherein the catalyst is $Me_2Si(2-Me_3Si,4Me_2tBuSiCp)_2YH$ or $Me_2Si(2-Me_3Si,4-tBuCp)_2SmH$.

4. The method as claimed in claim 1, wherein the catalyst is racemic.

5. The method as claimed in claim 1, wherein the catalyst is generated in situ in the presence of at least one portion of the first monomer.

6. The method as claimed in claim 1, wherein the catalyst is prepared by hydrogenation of an alkyl precursor thereof.

7. The method as claimed in claim 1, wherein the blocks are homopolymers or random copolymers.

8. The method as claimed in claim 1, wherein the block copolymer comprises a block of a poly-alpha-olefin and a block of the polymerized second monomer which is a vinyl, vinylidene or lactone compound.

9. The method as claimed in claim 8, wherein the second monomer is a vinyl or vinylidene compound represented by the formula $H_2C=CR=Z$ in which R' is hydrogen or an alkyl radical having from 1 to 12 carbon atoms and Z is an electron-withdrawing radical.

10. The method as claimed in claim 9, wherein the vinyl or vinylidene compound is an ester of an unsaturated carboxylic acid.

11. The method as claimed in claim 8, wherein the poly-alpha-olefin is crystalline.

12. The method as claimed in claim 1, wherein the second monomer is polar.

13. The method as claimed in claim 1, for preparing a poly-alpha-olefin/PMMA or poly-alpha-olefin/polylactone copolymer.

14. The method as claimed in claim 1, wherein the block copolymer comprises a block of a first poly-alpha-olefin and a block of the polymerized second monomer which is an alpha-olefin to provide a second poly-alpha-olefin.

15. The method as claimed in claim 14, wherein the first poly-alpha-olefin is crystalline and the second poly-alpha-olefin is crystalline.

16. The method as claimed in claim 15, for preparing a PP/PE copolymer.

17. The method as claimed in claim 14, wherein the first poly-alpha-olefin is crystalline and the second poly-alpha-olefin is amorphous.

18. The method as claimed in claim 17, for preparing a PP/EP copolymer.

19. The method as claimed in claim 1, wherein the block copolymer comprises a first iPP block.

20. The method as claimed in claim 1, wherein the catalyst is racemic and is generated in situ in the presence of at least one portion of the first monomer.

21. The method as claimed in claim 20, wherein the catalyst is prepared by hydrogenation of an alkyl precursor thereof.

* * * * *